US006438303B1

(12) United States Patent
Abbott, III et al.

(10) Patent No.: US 6,438,303 B1
(45) Date of Patent: Aug. 20, 2002

(54) LASER OPTIMIZED MULTIMODE FIBER AND METHOD FOR USE WITH LASER AND LED SOURCES AND SYSTEM EMPLOYING SAME

(75) Inventors: John S. Abbott, III, Elmira; Douglas E. Harshbarger, Corning, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/501,490

(22) Filed: Feb. 9, 2000

Related U.S. Application Data
(60) Provisional application No. 60/174,722, filed on Jan. 6, 2000, and provisional application No. 60/121,169, filed on Feb. 22, 1999.

(51) Int. Cl.[7] ................................................. G02B 6/02
(52) U.S. Cl. ....................................... 385/123; 65/17.1
(58) Field of Search ............................. 385/123; 65/3 A, 65/2, 29, 17.1

(56) References Cited

U.S. PATENT DOCUMENTS

| | | | | |
|---|---|---|---|---|
| RE28,029 E | * | 6/1974 | Keck et al. .................. | 65/3 A |
| 3,932,162 A | | 1/1976 | Blankenship .................. | 65/3 |
| 4,286,979 A | | 9/1981 | Buckler et al. ................ | 65/3 |
| 4,298,365 A | | 11/1981 | Bailey et al. ............... | 65/3.12 |
| 4,339,174 A | | 7/1982 | Levin ..................... | 350/96.31 |
| 4,599,098 A | | 7/1986 | Sarkar ....................... | 65/3.12 |
| 4,723,828 A | | 2/1988 | Garel-Jones et al. ..... | 350/96.15 |
| 4,797,556 A | | 1/1989 | Marzari et al. .............. | 250/551 |
| 4,800,265 A | | 1/1989 | Marzari et al. .............. | 250/227 |
| 5,226,102 A | | 7/1993 | Bukhshtab et al. ........... | 385/98 |
| 5,373,576 A | | 12/1994 | Minns et al. ............... | 385/125 |
| 5,903,696 A | | 5/1999 | Krivoshlykov .............. | 385/127 |
| 5,940,567 A | | 8/1999 | Garito ........................ | 385/127 |
| 6,356,680 B1 | * | 3/2002 | Kirk et al. .................. | 385/123 |

FOREIGN PATENT DOCUMENTS

| | | |
|---|---|---|
| WO | WO 98/27140 | 6/1998 |

OTHER PUBLICATIONS

Marcuse, *Principles of Optical Fiber Measurements*, pp. 255–312, (Academic Press, 1981).

S.E. Mechels et al., "High–Resolution Differential–Mode Delay Measurements in Optical Fibers Using a Frequency–Domain Phase–Shift Techique", IEEE Photonics Technology Letters, vol. 9, No. 6, Jun. 1997, pp. 794–796.

J.B. Schlager et al., "High Resolution Differential Mode Delay Measurements and Bandwidth of Multimode Fibers", Conference Proceedings, Leos '97, 10th Annual Meeting, IEEE Lasers and Electro–Optics Society, 1997 Annual Meeting, Nov. 10–13, 1997, pp. 46–47, vol. 2.

R. Olshansky, "Propagation in Glass Optical Waveguides", Reviews of Modern Physics, vol. 51, No. 2, Apr. 1979, pp. 341–367.

D. Gloge et al., "Multimode Theory of Graded–Core Fibers", The Bell System Technical Journal, Nov. 1973, pp. 1563–1578.

G. Coppa et al., "Solution of Wave Equation in Graded–Index Optical Fibres by Means of Multiparabolic Approximation", Electronics Letters, Nov. 12, 1991, vol. 17, No. 23, pp. 896–897.

E. Maekawa et al., Bandwidth Characteristics of Optical Transmission Line Constructed with Short–Length Optical Fibers, Journal of Lightwave Technology, vol. LT–4, No. 5, May 1986, pp. 530–537.

* cited by examiner

*Primary Examiner*—Ellen E. Kim
(74) *Attorney, Agent, or Firm*—Robert L. Carlson

(57) ABSTRACT

A multimode optical fiber having a first laser bandwidth greater than 220 MHz.km in the 850 nm window, a second laser bandwidth greater than 500 MHz.km in the 1300 nm window, a first OFL bandwidth of at least 160 MHz.km in the 850 nm window, and a second OFL bandwidth of at least 500 MHz.km in the 1300 nm window is disclosed. The multimode fiber is capable of operating in telecommunication systems employing both LED power sources and high power laser sources. Methods of making and testing the multimode optical fiber are also disclosed.

30 Claims, 8 Drawing Sheets

LASER OPTIMIZED MULTIMODE FIBER AND METHOD FOR USE WITH LASER AND LED SOURCES AND SYSTEM EMPLOYING SAME

CROSS-REFERENCE TO RELATED APPLICATIONS

This application hereby claims priority of U.S. patent application Ser. No. 60/121,169 filed on Feb. 22, 1999, and U.S. patent application Ser. No. 60/174,722 filed on Jan. 6, 2000, the contents of which are relied upon and incorporated herein by reference in its entirety, and the benefit of priority under 35 U.S.C. §120 is hereby claimed.

BACKGROUND OF THE INVENTION

1. Field of the Invention

The present invention relates generally to a multimode optical fiber and method for use with telecommunication systems employing low data rates, as well as systems employing high data rates, and more particularly, to a multimode optical fiber and method optimized for applications designed for state of the art laser sources, as well as common light emitting diode sources.

While the present invention is subject to a wide range of applications, it is particularly well suited for use in telecommunications systems designed to transmit data at rates equal to and exceeding one gigabit/sec.

2. Technical Background

The goal of the telecommunication industry is generally to transmit greater amounts of information, over longer distances, in shorter periods of time. Over time, it has been shown that this objective is a moving target with no apparent end in sight. As the number of systems users and frequency of system use increase, demand for system resources increases as well.

Until recently, data networks have typically been served by Local Area Networks (LANs) that employ relatively low date rates. For this reason, Light Emitting Diodes (LEDs) have and continue to be the most common light source in these applications. However, as data rates begin to increase beyond the modulation capability of LEDs, system protocols are migrating away from LEDs, and instead, to laser sources. This migration is evidenced by the recent shift toward systems capable of delivering information at rates equal to and exceeding one (1) gigabit/sec.

While such transmission rates will greatly enhance the capabilities of LANs, it does create an immediate concern for system owners. Multimode optical fiber currently employed in telecommunication systems is designed primarily for use with LED sources and is generally not optimized for use with the lasers envisioned to operate in systems designed to transmit information at rates equal to or greater than one (1) gigabit/sec. Laser sources place different demands on multimode fiber quality and design, compared to LED sources. Historically, the index profile at the core of multimode fibers has been tuned to produce high bandwidth with LED sources, which tend to overfill the core. The combination of the light intensity distribution from the LED source input pulse and the index profile of the fiber produces an overfilled modal weighting that results in an output pulse that has a relatively smooth rise and fall. Although peaks or plateaus resulting from small deviations from the ideal near-parabolic index profile do occur, their magnitude does not impact system performance at low data rates. In laser based systems, however, the intensity distribution of the source concentrates its power near the center of the multimode fiber. Consequently, small deviations in the fiber profile can produce significant perturbations in the impulse rise and fall, which can have a large effect on system performance. This effect can manifest itself in the form of excessively low bandwidth, as excessively high temporal jitter, or both. Although it is possible to correct these deficiencies to some degree by changing the launch condition of the source, such as the offset launch mode conditioning patch cord or the laser beam expander, this is typically not a practical solution for system owners.

A typical campus layout for a LAN system is designed to meet certain specified link lengths. The standard for the campus backbone (which travels between buildings) typically has a link length of up to about 2 km. The building backbone or riser (which travels between floors of a building) typically has a link length of up to about 500 meters. The horizontal link length (which travels between offices on a floor of a building) typically has a link length of up to about 100 meters. Older and current LAN technology, such as 10 Megabit Ethernet, can achieve a 2 km link length transmission with standard grade multimode optical fiber. However, next generation systems capable of gigabit/sec. and higher transmission rates cannot achieve all of these link lengths with standard multimode fiber presently available. In the 850 nm window, standard multimode fiber is limited to a link length of approximately 220 meters. In the 1300 nm window, standard grade fiber is limited to a link length of only about 550 meters. Accordingly, present technology only enables, at most, coverage for about two of the three campus link lengths. To fully enable a LAN for gigabit/sec. transmission rates, a multimode fiber capable of transmitting information over each of the three link lengths is necessary.

As used herein, overfilled (OFL) bandwidth is defined as the bandwidth using the standard measurement technique described in EIA/TIA 455-51FOTP-51A, "Pulse Distortion Measurement of Multimode Glass Optical Fiber Information Transmission Capacity", with launch conditions defined by EIA/TIA 455-54A FOTP-54 "Mode Scrambler Requirements for Overfilled Launching Conditions to Multimode Fibers".

As used herein, laser bandwidth is defined as and measured using the standard measurement technique described in EIA/TIA 455-51A FOTP-51 and either of the following two launch conditions methods. Method (a) is used to determine the 3 dB bandwidth at 1300, and method (b) is used to determine the 3 dB bandwidth at 850 nm. Method (a), which is used to determine the 3 dB laser bandwidth at 1300 nm, utilizes a 4 nm RMS spectral width 1300 nm laser with a category 5 coupled power ratio launch modified by connection of a 2 meter, standard step index, single-mode fiber, patch-cord wrapped twice around a 50 mm diameter mandrel. The launch condition is further modified by mechanically offsetting the central axis of the singlemode fiber from that of the multimode fiber in such a manner that a 4 um lateral offset between the central axis of the core of the single mode fiber patch-cord and the multimode fiber under test is created. Note: category 5 coupled power ratio is described in and measured using procedures in TIA/EIA 526-14A OFSTP 14 appendix A "Optical Power Loss Measurements of Installed Multimode Fiber Cable Plant. Method (b), which is used to determine the 3 dB laser bandwidth at 850 nm, utilizes a 0.85 nm RMS spectral width 850 nm OFL launch condition, as described in EIA/TIA 455-54A FOTP 54, connected to a 1 meter length of a specially designed multimode fiber having a 0.208 numerical aperture and a graded index profile with and alpha of 2. Such a fiber can be created by drawing down a standard 50 $\mu$m diameter core multimode fiber having a 1.3 index of refraction delta (delta=$n_o^2-n_c^2/2n_o n_c$, where $n_o$=the index of refraction of the core and $n_c$=the index of refraction of the cladding) to a 23.5 µm diameter core.

Today, in order to increase distance, manufacturers typically shift bandwidth between two wavelength windows by changing the shape of the refractive index profile. Depending upon the changes made, the result is either high OFL bandwidth at the 850 nm window with low OFL bandwidth at the 1300 nm window, or low OFL bandwidth at the 850 nm with high OFL bandwidth at the 1300 nm window. For example, for a standard 2% Delta 62.5 um FDDI-type fiber, the refractive index profile can be adjusted to result in OFL bandwidth of 1000 MHz.km at 850 nm and 300 MHz.km at 1300 nm, or it can be adjusted to result in OFL bandwidth of 250 MHz.km at 850 nm and 4000 MHz.km at 1300 nm. With such multimode optical waveguide fibers having standard "alpha" profiles, however, it is not possible to achieve an OFL bandwidth of 1000 MHz.km at 850 nm and 4000 MHz.km at 1300 nm. More typically, manufacturing tolerances would allow 850 nm/1300 nm OFL bandwidths of 600 MHz.km/300 MHz.km or 200 MHz.km/1000 MHz.km but not 600 MHz.km/1000 MHz.km.

There is a disconnect, however, between these historical bandwidth shifts, and what is necessary for gigabit/sec. transmission rates. Because high speed lasers are the standard light source for LANs designed to deliver information at rates exceeding a gigabit/sec., a multimode optical fiber having increased bandwidth at both the 850 nm and 1300 nm window is desired.

Moreover, because such LANs are in their infancy, all of the system components necessary to meet and/or exceed transmission rates of one gigabit/sec. are not yet fully reduced or practiced, optimized, and/or tested. For these reasons, it is not practical to replace existing LAN systems with a new LAN system speculatively designed to meet or exceed such high data rates. While it may be possible to achieve this result, it will likely not be the preferred or optimal solution, as following such a course of action will likely result in costly upgrades to the system and potentially a rework of the entire system.

SUMMARY OF THE INVENTION

The present invention is directed to a multimode optical fiber that is optimized for high speed laser sources capable of 1.0, 2.5, and 10 gigabit per second data transmission while exceeding the link length requirements discussed above. Moreover, the same multimode optical fiber maintains sufficiently high OFL bandwidth to support the transmission of information with the 1300 nm and 850 nm LED sources presently used in LAN systems. Such a multimode optical fiber will enable current LAN system owners to maintain their present LED based LAN systems, while at the same time enable them to easily transfer to a "Gigabit Ethernet System" without having to undertake a costly multimode fiber upgrade. As used herein, "Gigabit Ethernet System" is defined as a telecommunication system, such as a LAN, which is capable of transmitting data at rates equal to and/or exceeding one (1) gigabit/sec.

Accordingly, one aspect of the present invention relates a multimode fiber having a first laser bandwidth greater than 220 MHz.km in the 850 nm window, a second laser bandwidth greater than 500 MHz.km in the 1300 nm window, a first OFL bandwidth of at least 160 MHz.km in the 850 nm window, and a second OFL bandwidth of at least 500 MHz.km in the 1300 nm window. Such a multimode optical fiber has a variety of uses in the telecommunication industry, and is particularly well suited for use in telecommunication systems employing high speed laser sources. Such a fiber has the added benefit of providing sufficient OFL bandwidth for LED sources presently used in LAN systems.

In another aspect, the invention is directed to a multimode transmission system capable of transmitting data at rates equal to and exceeding one gigabit/sec. The multimode transmission system includes a laser source which transmits at least one gigabit/second of information, and a multimode optical fiber communicating with the laser source. The multimode optical fiber has a first laser bandwidth of at least 385 MHz.km in the 850 nm window which is capable of carrying the information at least 500 meters. The multimode optical fiber also has a second laser bandwidth of at least 746 MHz.km in the 1300 nm window for carrying the information at least 1000 meters. In addition, the multimode optical fiber includes first and second OFL bandwidths sufficiently high to be used with 850 nm and 1300 nm LED sources.

Another aspect of the present invention relates to a multimode optical fiber having a 62.5 µm core, and a cladding bounding the core. The cladding has a refractive index lower than the refractive index of the core, and the multimode optical fiber exhibits a DMD profile, which when measured at a wavelength of 1300 nm, includes a first region having an average slope measured from $(r/a)^2$ =0.0 to 0.25, and a second slope region having an average slope measured from $(r/a)^2$ =0.25 to 0.50. The slope of the first region is preferably greater than the slope of the second region. More preferably, the slope of the first region is greater than 1.5 times the slope of the second region.

In a further aspect, the present invention is directed to a method of forming a multimode optical fiber. The method includes the steps of thermochemically reacting a silica containing precursor reactant and at least one dopant reactant to form soot, and delivering the soot to a target in a manner sufficient to produce a glass preform having specified characteristics. The glass preform is drawn into a multimode optical fiber having a 62.5 µm core region and a cladding region bounding the core region. The reacting step includes selecting a precursor reactant and a dopant reactant according to a soot deposition recipe sufficient to result in a multimode optical fiber which exhibits a DMD profile, which when measured at a wavelength of 1300 nm, has a first average slope measured over a first region from $(r/a)^2$ =0.0 to 0.25, and a second average slope measured over a second region from $(r/a)^2$ 0.25 to 0.50, the first average slope being greater than the second average slope.

The multimode optical fiber of the present invention results in a number of advantages over other multimode optical fibers known in the art. One such advantage is that the multimode optical fiber of the present invention is fully compatible for use with high speed laser sources, as well as LED sources. Accordingly, the multimode optical fiber of the present invention can be used with conventional local area networks employing LED sources, and can be used with Gigabit Ethernet Systems, which employ high speed laser sources.

In addition, the multimode optical fiber of the present invention eliminates the need for costly mode conditioning patch cords often used to enable operation in the 1300 nm operating window for Gigabit Ethernet System protocol. For many multimode optical fibers, a mode conditioning patch cord is used to move power away from the center of the multimode fiber in order to avoid center line profile defects which typically result from some manufacturing processes. Because the preferred multimode optical fiber of the present invention is manufactured using the Outside Vapor Deposition process (OVD), the preferred multimode optical fiber of the present invention has reduced centerline profile defects. Accordingly, a mode conditioning patch cord is no longer needed to enable operation in the 1300 nm operating window of the preferred fiber of the present invention, thus allowing for on-center launch or slightly off-set due to loose connector tolerances, resulting in ease, of installation and use.

Moreover, the multimode optical fiber of the present invention optimizes laser performance with a variety of laser sources, such as, but not limited to, 780 nm Fabry-Perot lasers, 850 nm Vertical Cavity Surface Emitting Lasers (VCSELs), 1300 nm Fabry-Perot lasers, and low cost 1300 nm transmitters envisioned for the future. The multimode optical fiber of the present invention is also designed to support operation at 2.5 and 10 gigabits/second over significant link lengths when used with high performance lasers in more advanced telecommunication systems.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

A refractive index profile for a multimode optical fiber is disclosed, which is optimized both for applications using state of the art laser sources, as well as the more common LED sources. Alpha index of refraction profiles describe a profile shape which may vary continuously with radius. In the present invention, the refractive index profile preferably includes at least two regions having at least "alpha" exponents, commonly referred to by the symbol (a), such that the index profile changes smoothly from an alpha or alphas optimized for one or more laser sources (at one or more wavelengths) near the center of the profile to an alpha or alphas optimized for LEDs (at one or more wavelengths) near the outside of the profile. A multimode optical fiber having such an index profile extends both distance and data rate capability beyond that documented for telecommunication systems capable of delivering information at rates equal to and exceeding one (1) gigabit/sec. Because laser sources have smaller "spots" than LEDs, it has been found that the outer portion of the profile can be optimized according to OFL bandwidth requirements (typically 160–200 MHz.km at 850 nm and 500+MHz.km at 1300 nm, for multimode fibers having 62.5 um cores), while simultaneously optimizing the inner portion of the profile for laser bandwidth requirements and source characteristics. It is believed that this is the first profile which is simultaneously optimized for both large spot LEDs and small spot lasers at both the 1300 nm and 850 nm windows. Because the 1300 nm laser spot is even smaller than that of short wavelength (SX) laser sources, the inner profile requirements are preferably determined by the SX bandwidth requirements. It has been found that high laser bandwidth at both short wavelength (for example, with selected 780 nm CD lasers or 850 nm VCSELs), and long wavelength (for example, with 1300 nm or 1500 nm Fabry-Perot lasers) can be achieved when the inner profile is correctly optimized.

An important characteristic of the optimized index profile is that it provides high 1300 nm OFL bandwidth with LED sources so that the adjustment to the overall profile to achieve superior performance with lasers is small and/or in areas of the profile not affecting OFL bandwidth performance. This also requires that alpha(r) be a smooth function of r, without abrupt transitions.

The present invention is directed to a multimode optical fiber having an index profile specifically designed to provide high bandwidth and low temporal jitter with typical short wavelength (for example, 780, 850, or: 980 nm) lasers and long wavelength (for example, 1300 nm or 1500 nm) lasers while maintaining sufficiently high bandwidth and low jitter when used with legacy, 1300 nm and 850 nm LED sources.

The index profile of the multimode optical fiber of the present invention can be described in a number of ways. First, in a multimode fiber with M modes, the output pulse can be described as $P_{out}(t) = \Sigma P_m \delta(\tau_m - \tau_{ave})$, where the $m^{th}$ mode has relative power $P_m$ and mode delay $\tau_m$ relative to the average $\tau_{ave} = \Sigma P_m \tau_m / \Sigma P_m$. The OFL or laser bandwidth is determined from the amplitude of the Fourier transform of $P_{out}(t)$ and is optimized if all $\tau_m$ are equal.

The mode delays $\tau_m$ are determined by the index profile and the wavelength of operation. The modal power $P_m$ depends on the characteristics of the source (the specific laser, LED, etc.). The multimode fibers of the present invention are preferably designed to meet the OFL or laser bandwidth requirements for a majority of, and most preferably all, of the commonly used sources. For example, the fiber requirements might be that the OFL bandwidth be greater than 160 MHz.km and 500 MHz.km with 850 nm and 1300 nm LED sources, respectively, and that the laser bandwidth be greater than 385 MHz.km and 746 MHz.km with 850 nm VCSEL and 1300 nm Fabry-Perot laser sources, respectively.

A second way of describing the fiber's index profile relates to direct measurement of the index of refraction or the germania content of the core. Typical multimode fibers are designed to a have an index of refraction that varies as a function of radial position and is proportional to the germania content. This index profile, n(r), is described by the following function:

For $r<a, n(r)=n_1(1-2\Delta(r/a)^g)^{0.5}$ where $n_1$ is the index value at the center of the core, r is the radial position, a is the radius of the core clad interface, g is the profile shape parameter, and $\Delta$ is defined as:

$\Delta=(n_1^2-n_o^2)/2n_1^2$ where $n_o$ is the index value at the core-clad interface. This profile description is common in the literature with the exponent "g" frequently being denoted as alpha ($\alpha$). Those skilled in the art use both terms interchangeably without confusion.

For purposes of the present invention the index profile is defined as follows:

For $0<r<a, n(r)=n_1(1-2\Delta(r/a)^{g(r)})^{0.5}$

Here g(r) is a profile shape parameter which changes continuously with radius so that the OFL and laser bandwidth objectives described above in the first method of describing the index profile are met. Roughly speaking, the relative power of modes near the center is greater for the laser sources than for the LED sources, and greater for the long wavelength lasers (for example, 1300 nm Fabry-Perot laser) than for the short wavelength laser sources (for example, the typical 850 nm VCSEL sources). Thus, heuristically g(r) might vary from being optimized at 1300 nm at the very center, to being optimized for 850 nm at intermediate radii, and to being optimized at 1300 nm for larger radii. In practice, it is adequate for g(r) to vary from a larger value (equalizing mode delays closer to 780–850 nm) near the center to a lower value (equalizing closer to 1300 nm) at the outside. In practice g(r) never intentionally passes below the value appropriate for 1300 nm. It is important for the OFL bandwidth that g(r) vary smoothly and continuously.

Such an index profile with a varying g(r) can perhaps be visualized most easily with a third method for describing index profiles. This method uses what are known to those skilled in the art, as Differential Mode Delay (DMD) measurements. The method, briefly described, involves scanning a pulse from a single mode optical fiber radially across the multimode fiber core, and measuring the output pulse and mean delay time for pulses launched at different outset positions with respect to the core of the multimode fiber. The pulse delays are plotted as a function of radial position, and the local slope of the DMD vs. $(r/a)^2$ where "r" is defined as the radial offset of the single mode fiber relative to the center of the multimode core (i.e. the distance between the axial center of the single mode fiber and the axial center of the multimode core), and "a" is defined as the radius of the core of the multimode fiber, approximates the index profile parameter g(r). The local slope of the DMD vs $(r/a)^2$ curve is proportional to the local g(r) error relative to the optimum g (or alpha) for the given wavelength and Delta of the multimode optical fiber. The relationships between the DMD, the index error, and the "alpha error" is known to those skilled in the art, and is described in the following references.

Reference is made to Marcuse, *Principles of Optical Fiber Measurements*, pp. 255–310, (Academic Press, 1981), which is incorporated herein by reference as though fully set forth in its entirety, and to Olshansky, R., "Propagation in Glass Optical Waveguides," *Rev. Mod. Phys.*, Vol. 51, No. 2, April 1979, pp. 341–367, which is incorporated herein by reference as though fully set forth in its entirety, for a more detailed explanation of DMD measurements and techniques. In accordance with a preferred embodiment of the present invention, the OFL and laser bandwidth of a number of fibers with different refractive index profiles (and therefore DMDS) are measured, and fibers which achieve high bandwidth with both laser and LED sources are identified. The DMD of these optimum fibers characterize the desired or target profile for duplication in additional multimode optical fibers. This empirical procedure using the DMD does not characterize the $P_m$ of the different sources. Rather, it serves to characterize the fiber which works with the sources.

A key aspect of the present invention is that laser intensity distributions are generally much smaller than LEDs. For that reason, among others, it is possible to optimize the fiber index profile for both laser and LED operation. In accordance with one embodiment of the present invention, the outer portion of the index profile is optimized for 1300 nm LED, thereby ensuring good performance, i.e. OFL bandwidth greater than 500 MHz.km, for legacy systems. The inner portion of the index profile is optimized to provide more equal laser bandwidth at 1300 nm and 850 nm. By augmenting this design with manufacturing techniques that ensure a smooth index change, a multimode optical fiber having high laser bandwidth and low jitter for lasers of both wavelengths can be repeatedly manufactured.

Figure 1:
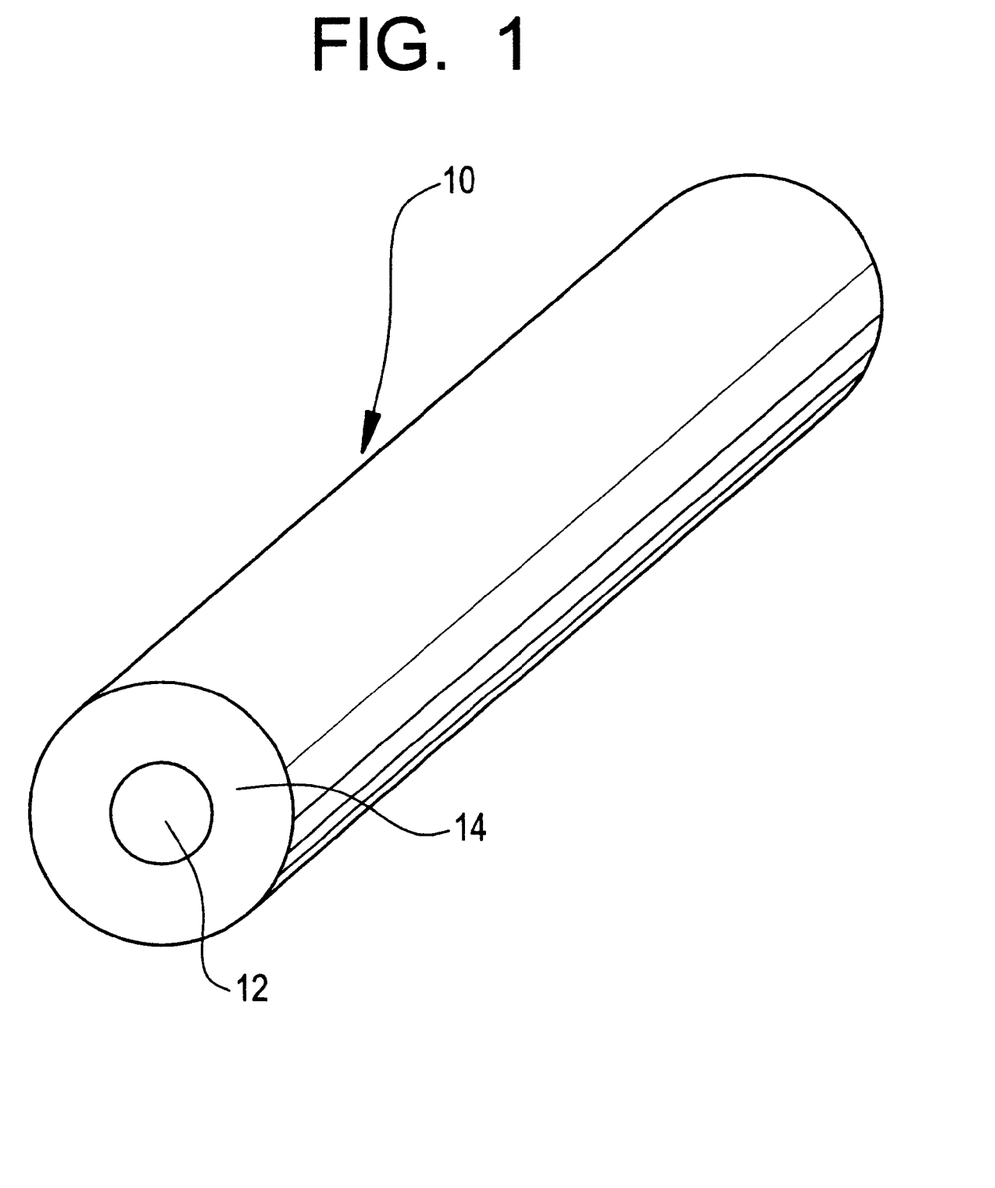
FIG. 1 is a perspective view of a preferred embodiment of a multimode optical fiber of the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the multimode optical fiber of the present invention is shown in FIG. 1, and is designated generally throughout by reference numeral 10.

Preferred multimode optical fiber 10 is a 62.5 μm multimode optical fiber optimized to have a first laser bandwidth greater than 220 MHz.km at 850 nm, and a second laser bandwidth greater than 500 MHz.km at 1300 nm. It will be understood by those skilled in the art, however, that multimode fibers in accordance with the present invention have been made which likely have similarly large bandwidths across the 850 and 1300 nm operating windows, i.e., between about 810 nm and 890 nm, more preferably 830 nm and 870 nm, and between about 1260 nm and 1340 nm, more preferably between about 1280 nm and 1320 nm.

In addition, preferred multimode optical fiber 10 includes a first OFL bandwidth of at least 160 MHz.km in the 850 nm window, and a second OFL bandwidth of at least 500 MHz.km in the 1300 nm window. More preferably, however, multimode optical fiber 10 has a 62.5 μm core 12 and is designed for a minimum laser bandwidth of 385 MHz.km at 850 nm, and a minimum laser bandwidth of 746 MHz.km at 1300 nm. It should be noted that the 1300 nm laser bandwidth mentioned above and described throughout the entirety of this specification, should preferably be measured with a 1300 nm laser meant for use with standard single mode fiber. It is presently believed by many of those skilled in the art that telecommunication systems capable of delivering data at rates equal to or exceeding one gigabit/sec. will require a mode conditioning patch cord to offset the laser launch at 1300 nm. For the multimode optical fiber of the present invention, however, the laser launch at 1300 nm is measured with the majority of the power being launched along the central axis of the multimode fiber. This obviates the need for such mode conditioning patch cords, thereby reducing system implementation, cost, and complexity. For a multimode optical fiber having a 50 μm core (not shown), the minimum laser bandwidth is preferably 500 MHz.km in the short wavelength window and 1684 MHz.km in the long wavelength window. When employed in a multimode transmission system employing high speed laser sources, such as a telecommunication system designed to transmit data at a rate of at least one (1) gigabit/sec., multimode optical fiber 10 having the 62.5 μm core 12 can carry at least one gigabit/sec of information over a link length of at least 500 m in the short wavelength, and over a link length of 1000 m in the long wavelength. These distances are increased to link lengths of over 600 m and 2000 m, respectively, for a 50 μm core multimode optical fiber. Those skilled in the art, however, will recognize that preferred multimode optical fiber 10 is not limited to the one gigabit/sec transmission rate. Rather, the present invention is capable of data rate transmission in excess of ten (10) gigabits/sec over significant link lengths. DMD measurement curves indicative of 62.5 μm core multimode optical fibers having properties sufficient to meet the above-described operating parameters are depicted in FIGS. 2 through 5.

Figure 2:
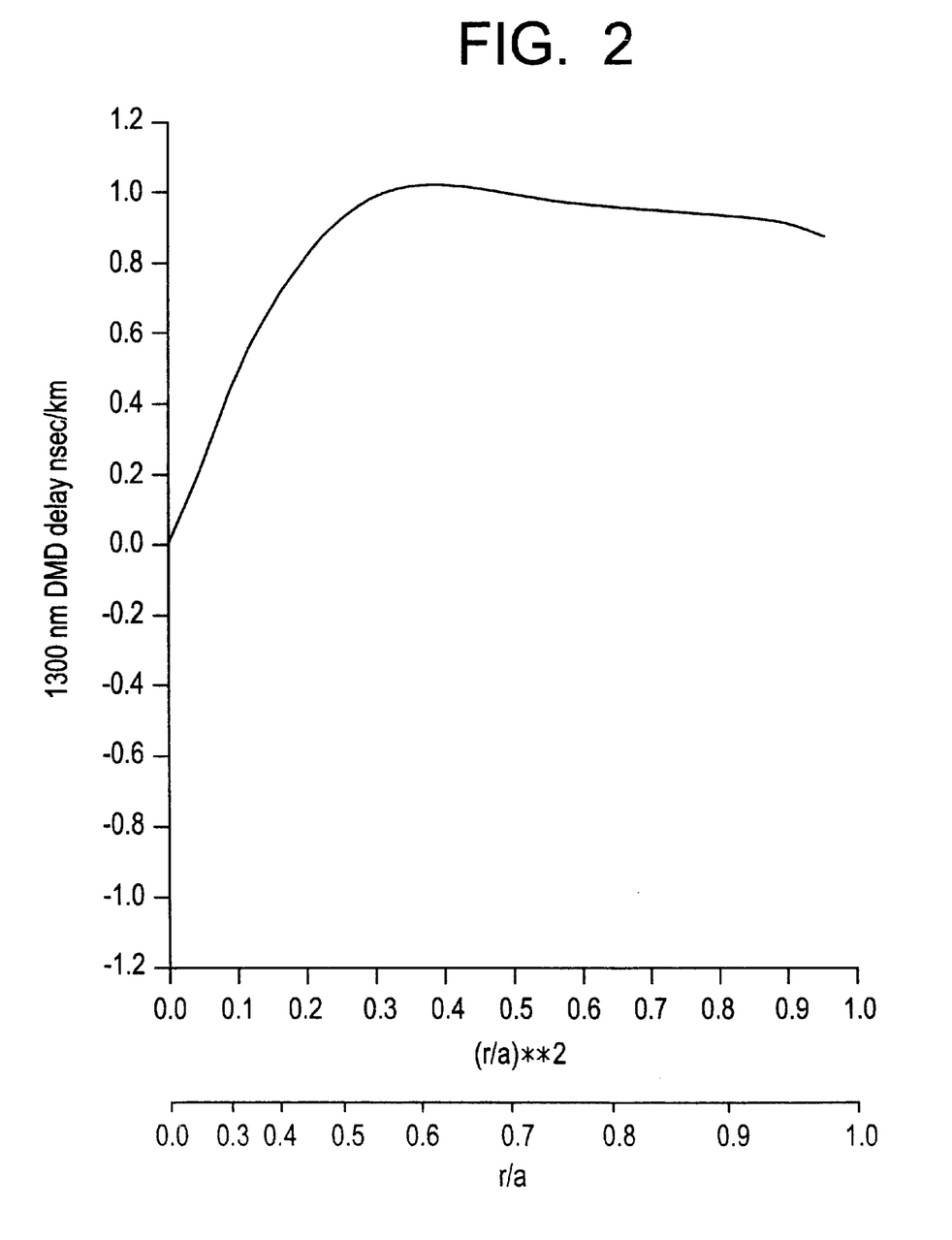
FIG. 2 is a DMD profile curve of the multimode optical fiber of FIG. 1 measured at 1300 nm.

FIG. 2 shows a DMD measurement curve 20 of a multimode optical fiber 10 made in accordance with the present invention. The DMD measurements of multimode optical fiber 10 were taken at 1300 nm using a standard pulse-based measurement technique similar to that described in Marcuse, *Principles of Optical Fiber Measurements*, pp. 255–310, (Academic Press, 1981), and Olshansky, R., "Propagation in Glass Optical Waveguides," *Rev. Mod. Phys.*, Vol. 51, No. 2, April 1979, pp. 341–367, which have been incorporated herein by reference. In a region where the 1300 nm DMD measurement curve slopes up the index profile is essentially optimized for a wavelength less than 1300 nm, and in a region where the DMD curve slopes down the index profile is essentially optimized for a wavelength greater than 1300 nm. In the region where the DMD curve is nearly flat the index profile is essentially optimized for 1300 nm.

Figure 3:
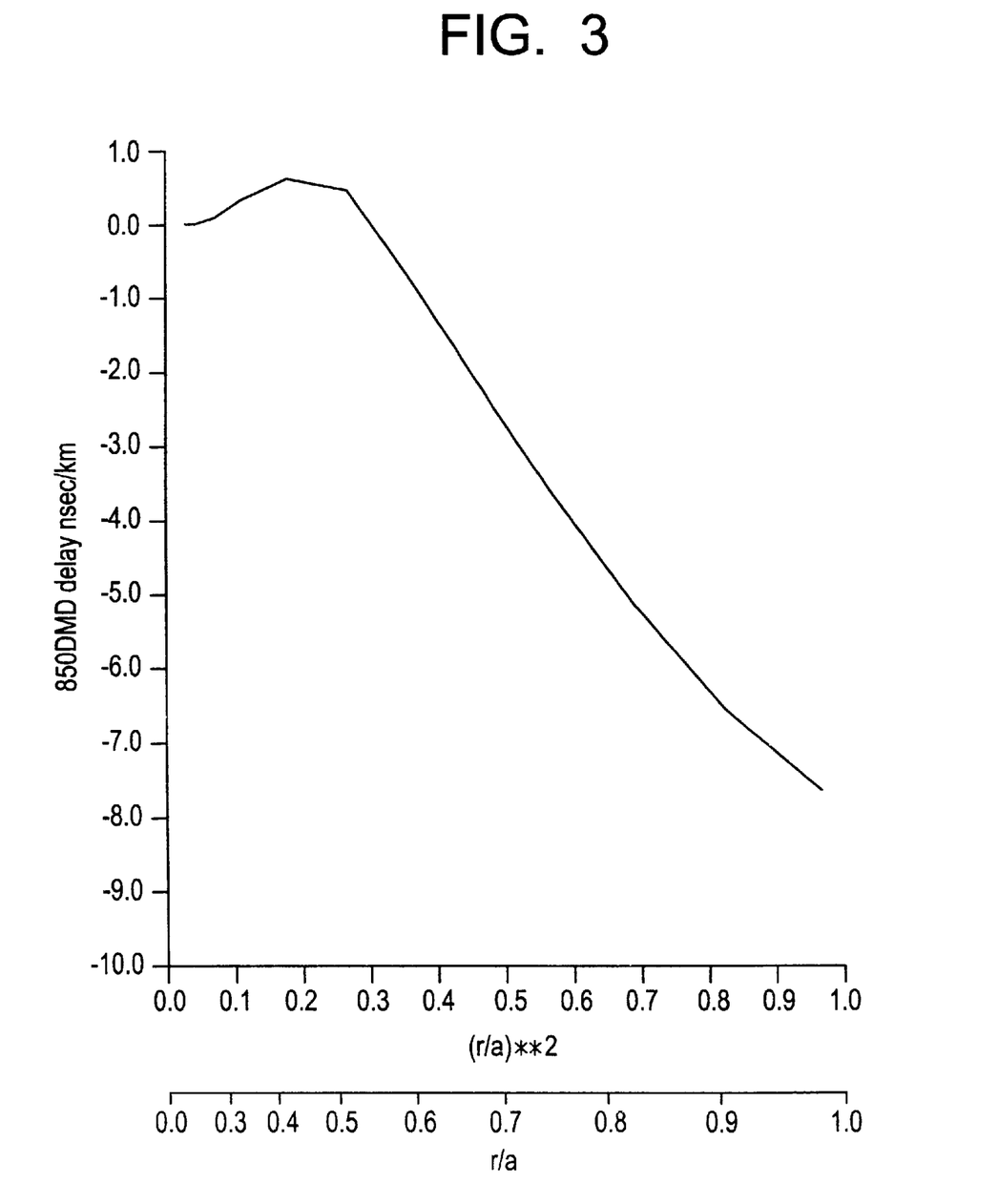
FIG. 3 is a DMD profile curve of the multimode optical fiber of FIG. 1 measured at 850 nm.

A DMD measurement curve 30 of multimode optical fiber 10, measured at 850 nm using a commercially available Photon-Kinetics Model 2500 Optical Fiber Measurement Bench, is depicted in FIG. 3. Again, in the region where the DMD curve is slightly rising, the index profile is optimized for a wavelength slightly less than 850 nm, and in the region where the DMD curve slopes down, it indicates an index profile is optimized for a wavelength greater than 850 nm.

Figure 4:
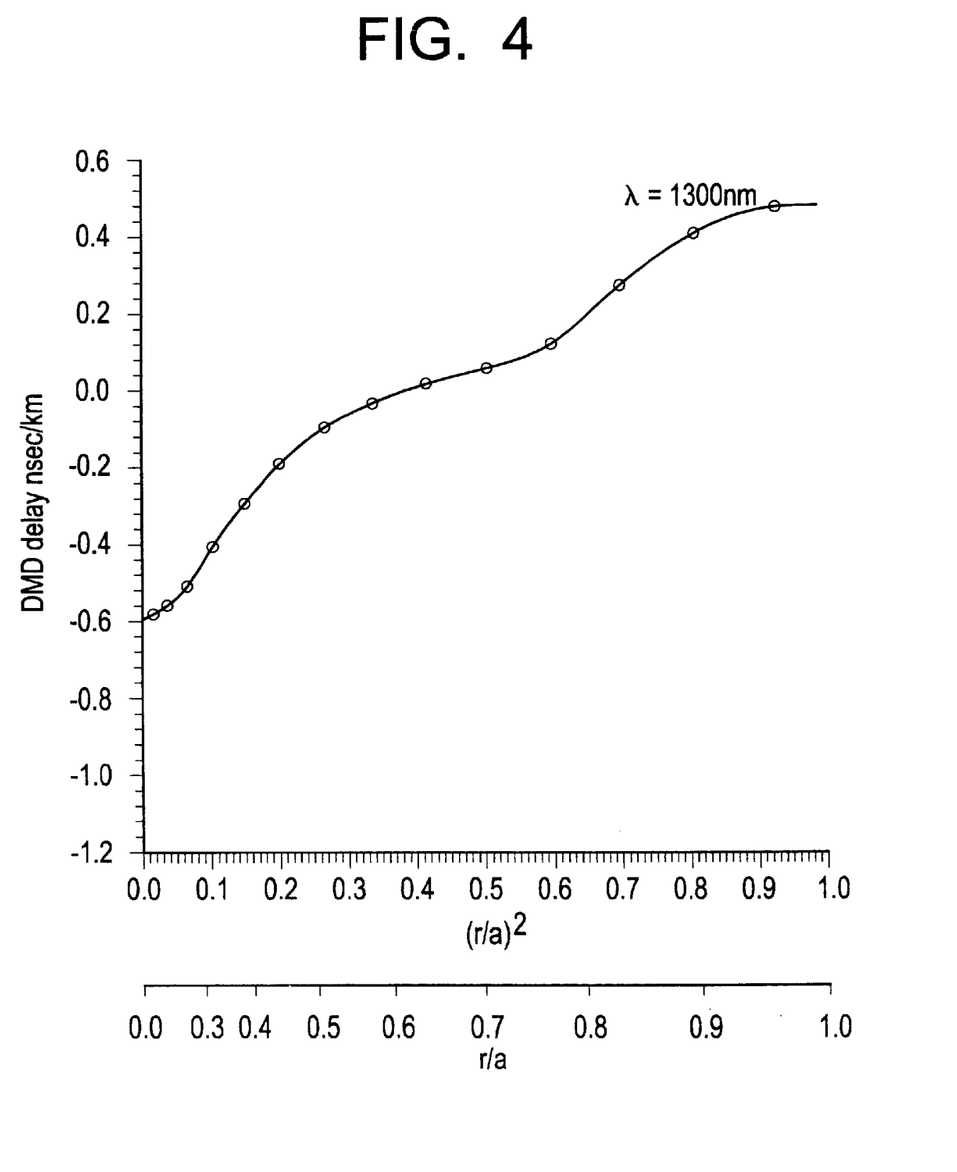
FIG. 4 is a DMD profile curve of a second preferred embodiment of a multimode optical fiber of the present invention measured at 1300 nm.

A DMD profile 40 measured at 1300 nm of a second preferred multimode optical fiber (not shown), is depicted in FIG. 4. Although DMD profile 40 differs slightly from DMD profile 20, it also describes multimode optical fibers having properties sufficient to meet the desired operating parameters for a multimode optical fiber having a 62.5 μm or 50 um core.

Figure 5:
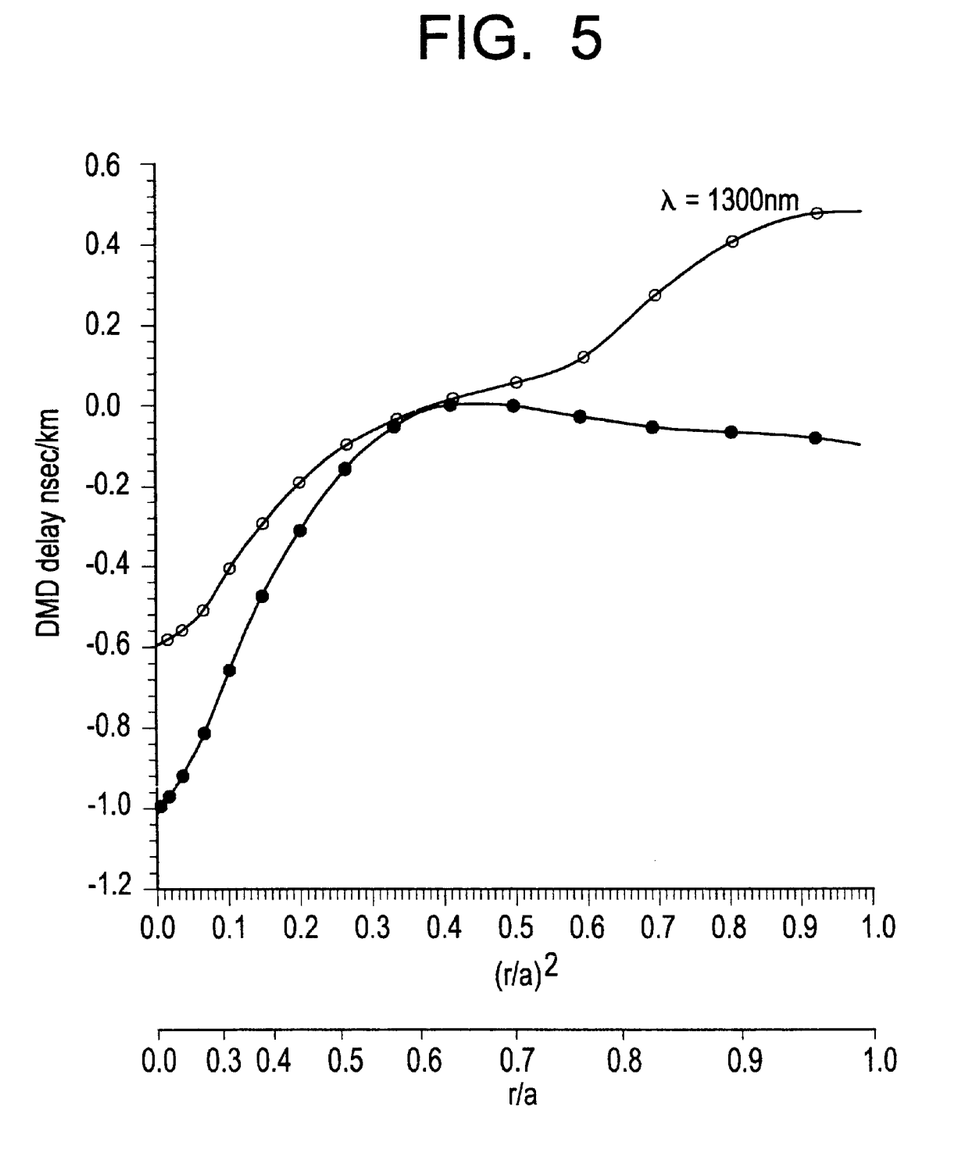
FIG. 5 is a graph showing the DMD profile curve of the multimode optical fiber of FIG. 1, and the DMD profile curve for a second preferred multimode optical fiber measured at 1300 nm.

DMD profiles 20 and 40 are both shown in the same graph in FIG. 5 measured at 1300 nm. The plots have each been shifted so that they agree at a common point where the slopes are similar (rather than $(r/a)^2=0$, and this point is arbitrarily defined as zero (0) delay. Broadly speaking, when measured at a wavelength of 1300 nm, a target DMD profile includes a first region having an average slope measured from $(r/a)^2=0.0$ to 0.25, and a second region having an average slope measured from $(r/a)^2=0.25$ to 0.50, the slope of the first region being greater than the slope of the second region. Said differently, the target DMD profile is not linear. More preferably, the slope of the first region is at least 1.5 times greater than the slope of the second region. Most preferably, the target DMD profile includes a third region having an average slope measured from $(r/a)^2=0.4$ to 0.6, in which the change in DMD from $(r/a)^2=0.4$ to 0.6 is at most +0.20 nsec/km.

The preferred method of forming a multimode optical fiber in accordance with the present invention and having the above-described target DMD profile includes the steps of thermochemically reacting a silica containing precursor reactant and at least one dopant reactant to form soot, delivering the soot to a target in a manner sufficient to produce a glass preform having specified characteristics, and drawing the glass preform into a multimode optical fiber having a 62.5 μm or 50 um core region. The reacting step further includes selecting the precursor reactant and at least one dopant reactant according to a soot deposition recipe sufficient to result in a multimode optical fiber that exhibits the characteristics of the target DMD profile. In a preferred embodiment, the soot deposition recipe includes the required proportions of $SiCl_4$ and $GeCl_4$ which result in a multimode optical fiber meeting the requirements of the desired target profile. When measured at a wavelength of 1300 nm, Such a multimode optical fiber will have a first average slope measured over a first region from $(r/a)^2=0.0$ to 0.25, and a second average slope measured over a second region from $(r/a)^2=0.25$ to 0.50, with the first average slope being greater than the second average slope. It will be understood, however, that the present invention is not limited to $SiCl_4$ and $GeCl_4$.

Figure 7:
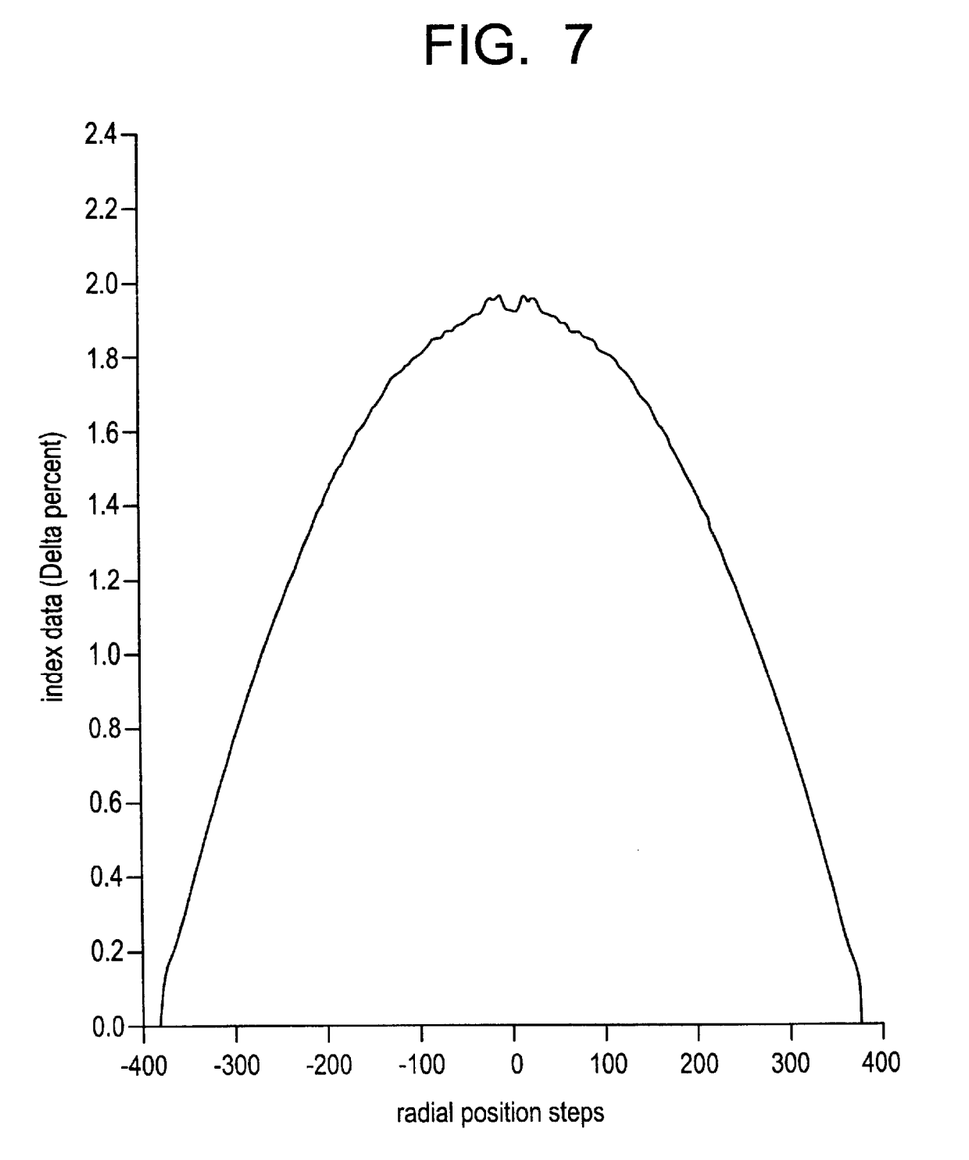
FIG. 7 is the refractive index profile curve of the first preferred embodiment of the multimode optical fiber of the present invention, which has the DMD profile of FIG. 2.
Figure 8:
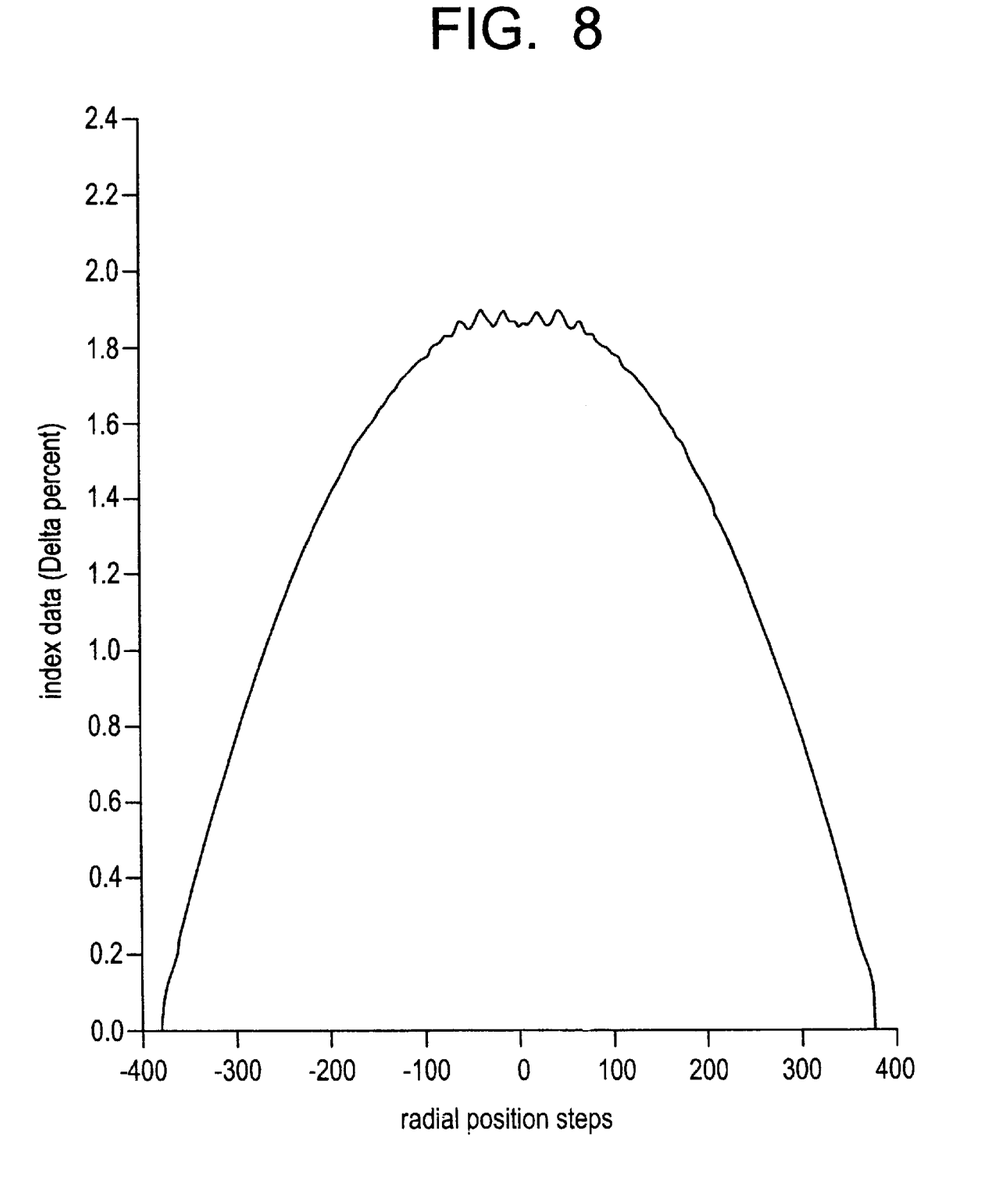
FIG. 8 is the refractive index profile curve of the second preferred embodiment of the multimode optical fiber of the present invention, which has the DMD profile of FIG. 4.

FIG. 7 shows the substantially parabolic refractive index profile curve of the first preferred embodiment of the multimode optical fiber of the present invention (the same fiber that exhibits the DMD profile curve of FIGS. 2 and 3). FIG. 8 shows the substantially parabolic refractive index profile curve of the second preferred embodiment of the multimode optical fiber of the present invention (the same fiber that exhibits the DMD profile of FIG. 4). Although these figures are not needed for practicing the present invention, as described above, they clearly demonstrate the benefit of the DMD measurement techniques used in accordance with the present invention. With the exception of the slight differences in the refractive index profile perturbations at the peak regions of the refractive index profiles depicted in FIGS. 7 and 8, the other regions of the refractive index profiles are strikingly similar for both the first and second preferred embodiments of the multimode optical fibers of the present invention.

While it is not specifically described herein, a multimode optical fiber having a 50.0 μm core can be similarly formed. It will be understood by those skilled in the art that the target DMD profile for such a multimode optical fiber will differ from the target DMD profile of a multimode optical fiber having a 62.5 μm core as described above. Thus, the soot deposition recipe will differ as well. It will be further understood that a target DMD profile can be described by defining the regions of slope as a first region from $(r/a)^2=0.0$ to 0.2, and a second region from $(r/a)^2$0.2 to 0.4.

EXAMPLE

The invention will be further clarified by the following example which is intended to be exemplary of the invention.

Example 1

One method of testing the performance of the laser optimized multimode fiber is to manufacture a fiber having the desired DMD characteristics and test it with a variety of laser sources. The results of such testing are shown in FIG. 6.

Figure 6:
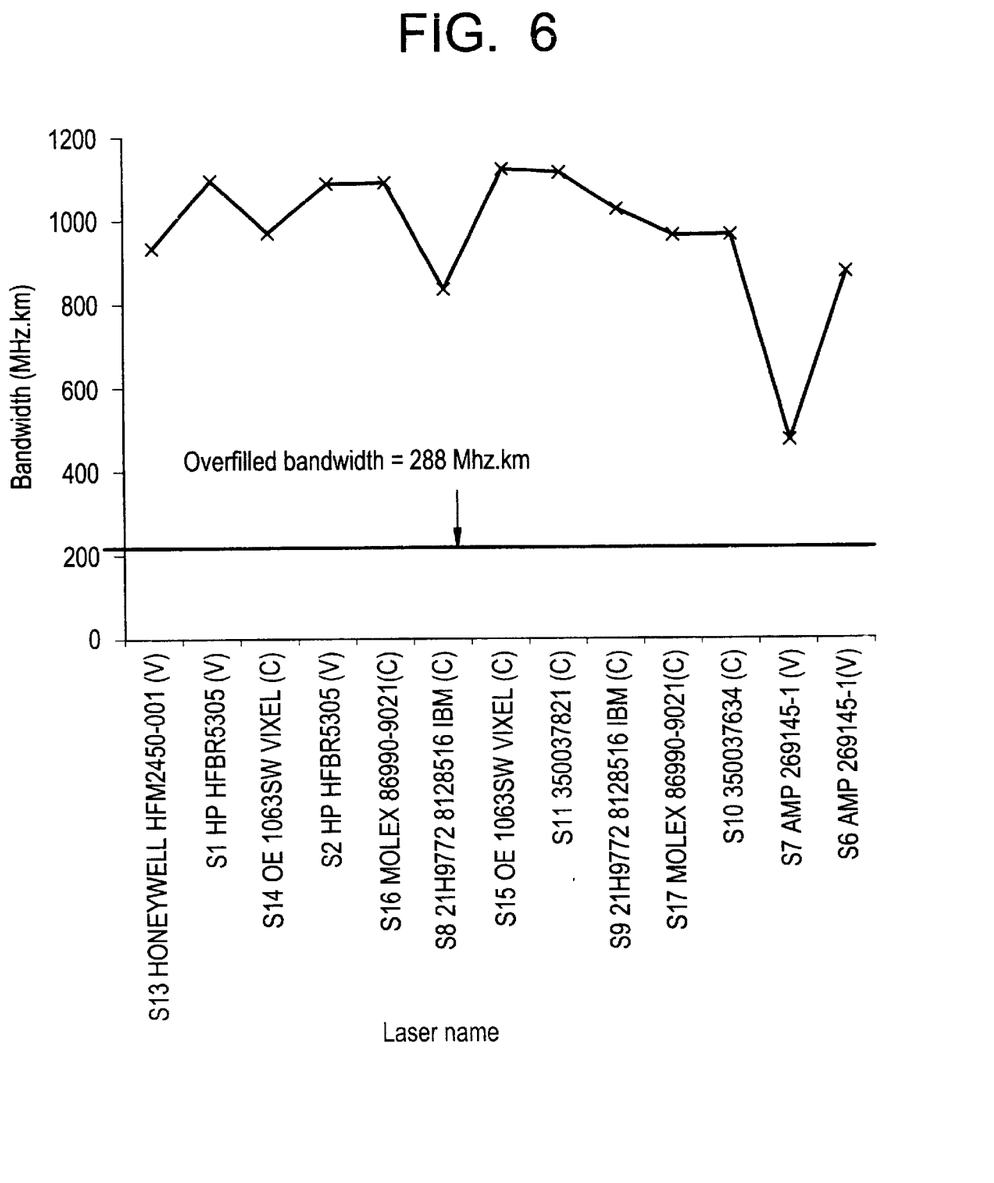
FIG. 6 shows the bandwidth of the optical fiber of FIG. 1 for a variety of laser sources.

The 'effective' bandwidth (MHz.km) of the multimode optical fiber characterized by the DMD profile depicted in FIGS. 2–3 and 7 is shown in FIG. 6 for a variety of 780 to 850 nm Gigabit Ethernet System lasers. The fiber's overfilled (OFL) bandwidth, measured using the standard measurement and launch techniques referenced earlier in this application, was 288 MHz.km at 850 nm and 1054 MHz.km at 1300 nm. The fiber's laser bandwidth, measured using the standard measurement and launch techniques referenced earlier in this application was 930 MHz.km at 850 nm (using the patchcord with a 23.5 um diameter core as well as a 850 nm source laser with an RMS spectral width less than 0.85 nm, as described earlier) and 2028 MHz.km at 1300 nm (using a Fabry-Perot laser typical for single mode fiber applications and a patchcord ensuring a launch offset 4 um from the center of the core). The 'effective' bandwidths shown in FIG. 6 for various Gigabit Ethernet System laser sources are measured with the same measurement technique as the defined 850 nm laser bandwidth with a 23.5 um patchcord, but with a launch condition that varies with each individual Gigabit Ethernet System laser because each laser has a different distribution of power, both in the near field and in the far field. This demonstrates that large bandwidths may be exhibited using the fiber of the present invention together with a large variety of laser launches. The measured laser bandwidth with the defined launch (930 MHz.km) is approximately the same as obtained with a number of actual Gigabit Ethernet System lasers. The short wavelength Gigabit Ethernet System laser bandwidths are all clearly superior to the 850 nm OFL bandwidth of 288 MHz.km and in the range required to significantly extend Gigabit Ethernet System link lengths. In addition, the 1300 nm laser bandwidth measured using a 1300 nm Fabry-Perot laser with a 4 um offset was more than double that of the 1300 nm OFL bandwidth.

Example 2

As a second example, the fiber whose measured DMD is in FIG. 4 and whose measured index profile is in FIG. 8 was tested for OFL bandwidth, for 'defined' laser bandwidth using the 23.5 um patchcord at 850 nm and the 4 um offset at 1300 nm, and for 'effective' bandwidth with a set of 13 Gigabit Ethernet System lasers. The standard OFL bandwidth was measured at 564 MHz.km at 850 nm and 560 MHz.km at 1300 nm. The 'defined' laser bandwidth at 850 nm using the patchcord with a 23.5 um diameter core was 826 MHz.km, while at 1300 nm the laser bandwidth defined by using a Fabry-Perot laser with a 4um offset had a value of 5279 MHz.km. The 'effective' bandwidths measured with 13 Gigabit Ethernet System lasers at 850 nm or 780 nm were as follows: 1214, 886, 880,876, 792, 786, 754, 726, 614, 394, 376, 434 and 472 MHz.km. Again, the defined laser launch for 850 nm with a patchcord with a 23.5 um diameter core yields a bandwidth which approximates the 'effective' bandwidth seen with a number of actual Gigabit Ethernet laser sources.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of forming a multimode optical fiber, said method comprising the steps of:

thermochemically reacting a silica containing precursor reactant and at least one dopant reactant to form soot;

delivering the soot to a target in a manner sufficient to produce a glass preform having specified characteristics; and drawing the glass preform into a multimode optical fiber having a 62.5 µm core region, and a cladding region bounding the core region, and wherein said reacting step comprises selecting said precursor reactant and said at least one dopant reactant according to a soot deposition recipe sufficient to result in a multimode optical fiber that exhibits a DMD profile, which when measured at a wavelength of 1300 nm, includes a first average slope measured over a first region from $(r/a)^2=0.0$ to 0.25, and a second average slope measured over a second region from $(r/a)^2=0.25$ to 0.50, and wherein the first average slope is greater in magnitude than the second average slope.

2. The method of claim 1 wherein said at least one dopant reactant comprises germanium and wherein the reacting step comprises the step of thermochemically reacting said germanium to form germania containing soot, and wherein the delivering step comprises selectively delivering the germania containing soot to a target in sufficient quantities to result in the average slope over the first region being at least 1.5 times greater than the average slope over the second region.

3. The method of claim 2 wherein the reacting step comprises the step of selecting a quantity of said germanium sufficient to result in said multimode optical fiber exhibiting a change in DMD of at least +0.3 nsec/km over the first region.

4. The method of claim 3 wherein the reacting step comprises the step of selecting a quantity of said germanium sufficient to result in said multimode optical fiber exhibiting a change in DMD of at most +1.25 nsec/km over the first region.

5. The method of claim 1 wherein the reacting step comprises the step of selecting a quantity of said germanium sufficient to result said multimode optical fiber exhibiting a change in DMD of at most +0.30 nsec/km over the second region.

6. The method of claim 1 wherein the reacting step comprises the step of selecting a quantity of said germanium sufficient to result said multimode optical fiber which includes a DMD profile having a third average slope measured over a third region from $(r/a)^2=0.4$ to 0.6, and wherein the change in DMD over the third region is at most +0.20 nsec/km.

7. The method of claim 1 wherein said at least one dopant reactant comprises germanium and wherein the reacting step comprises the step of thermochemically reacting said germanium to form germania containing soot, and wherein the delivering step comprises selectively delivering the germania containing soot to a target in sufficient quantities to result in the average slope over the first region being at least 2 times greater than the average slope over the second region.

8. The method of claim 7 wherein the reacting step comprises the step of selecting a quantity of said germanium sufficient to result in said multimode optical fiber exhibiting a change in DMD of at least +0.40 nsec/km over the first region.

9. The method of claim 1 wherein said at least one dopant reactant comprises germanium and wherein the reacting step comprises the step of thermochemically reacting said germanium to form germania containing soot, and wherein the delivering step comprises selectively delivering the germania containing soot to a target in sufficient quantities to result in the average slope over the first region being at least 3 times greater than the average slope over the second region.

10. The method of claim 9 wherein the reacting step comprises the step of selecting a quantity of said germanium sufficient to result in said multimode optical fiber exhibiting a change in DMD of at least 0.5 nsec/km over the first region.

11. A multimode optical fiber comprising:

a core having a diameter of about 62.5 μm; and a cladding bounding said core and having a refractive index lower than said core refractive index, and wherein said multimode optical fiber exhibits a DMD profile curve, which when measured at a wavelength of 1300 nm, comprises a first region having an average slope measured from $(r/a)^2=0.0$ to 0.25, and a second region having an average slope measured from $(r/a)^2=0.25$ to 0.50, and wherein the average slope of the first region is greater in magnitude than the average slope of the second region.

12. The multimode optical fiber of claim 11 wherein the change in DMD from $(r/a)^2=0.0$ to 0.25 is at least 1.5 times the change in DMD from $(r/a)^2=0.25$ to 0.50.

13. The multimode optical fiber of claim 12 wherein the change in DMD from $(ra)^2=0.0$ to 0.25 is at least +0.3 nsec/km.

14. The multimode optical fiber of claim 13 wherein the change in DMD from $(r/a)^2=0.0$ to 0.25 is at most +1.25 nsec/km.

15. The multimode optical fiber of claim 12 wherein the change in DMD from $(r/a)^2=0.25$ to 0.50 is at most +0.30 nsec/km.

16. The multimode optical fiber of claim 12 wherein the change in DMD from $(r/a)^2=0.0$ to 0.25 is at least 3 times the change in DMD from $(r/a)^2=0.25$ to 0.50.

17. The multimode optical fiber of claim 16 wherein the change in DMD from $(r/a)^2=0.0$ to 0.25 is at least 0.5 nsec/km.

18. The multimode optical fiber of claim 11 wherein the DMD profile includes a third slope measured from $(r/a)^2=0.4$ to 0.6, and wherein the change in DMD from $(r/a)^2=0.4$ to 0.6 is at most +0.20 nsec/km.

19. The multimode optical fiber of claim 11 wherein the change in DMD from $(r/a)^2=0.0$ to 0.25 is at least 2 times the change in DMD from $(r/a)^2=0.25$ to 0.50.

20. The multimode optical fiber of claim 17 wherein the change in DMD from $(r/a)^2=0.0$ to 0.25 is at least 0.4 nsec/km.

21. The multimode fiber of claim 1 wherein the DMD profile, when measured at a wavelength of 850 nm, includes a first average slope over a first region and a second average slope over a second region radially outside said first region, wherein the first slope has a magnitude which is less than the second slope.

22. The multimode fiber of claim 21 wherein the slope of the second region of the DMD profile measured at 850 nm is negative.

23. The multimode fiber of claim 22 wherein the slope of the first region of the DMD profile measured at 1300 nm is positive.

24. The multimode fiber of claim 1 wherein the DMD profile, when measured at a wavelength of 850 nm, includes a first average slope over a first region and a second average slope over a second region radially outside said first region, wherein the first slope has a magnitude which is less than the second slope.

25. The multimode fiber of claim 24 wherein the slope of the second region of the DMD profile measured at 850 nm is negative.

26. The multimode fiber of claim 25 wherein the slope of the first region of the DMD profile measured at 1300 nm is positive.

27. A transmission system comprising an optical fiber in accordance with claims 11, wherein said system is configured to allow for a data transmission rate of at least 1 gigabit/second.

28. The transmission system of claim 27, wherien said system is designed to transmit at least 1000 m at 1300 nm.

29. A transmission system comprising an optical fiber in accordance with claim 11, wherein said system is designed to transmit at least 1000 m at 1300 nm.

30. The transmission system of claim 29, wherein said system is capable of a data transmission rate of at least 2.5 gigabits/second.

* * * * *